United States Patent [19]

Kuratate et al.

[11] Patent Number: 5,066,109
[45] Date of Patent: Nov. 19, 1991

[54] HALF-TONE LIQUID CRYSTAL DISPLAY DEVICE

[75] Inventors: Tomoaki Kuratate; Mitsuhiro Koden; Hiroshi Hamada, all of Nara, Japan

[73] Assignee: Sharp Kabushiki Kaisha, Osaka, Japan

[21] Appl. No.: 401,921

[22] Filed: Sep. 1, 1989

[30] Foreign Application Priority Data

Sep. 2, 1988 [JP] Japan .................. 63-220860

[51] Int. Cl.$^5$ .............................................. G02F 1/13
[52] U.S. Cl. ...................................... 359/54; 359/70; 359/74; 359/79
[58] Field of Search .................... 350/334, 333, 339 R, 350/336; 357/30

[56] References Cited

U.S. PATENT DOCUMENTS

| | | | |
|---|---|---|---|
| 4,493,531 | 1/1985 | Bohmer et al. | 350/334 |
| 4,712,877 | 12/1987 | Okada et al. | 350/334 |
| 4,869,577 | 9/1989 | Masaki | 350/350 S |
| 4,935,757 | 6/1990 | Hatano et al. | 350/336 |
| 4,936,654 | 6/1990 | Suzaki et al. | 350/339 |
| 4,944,577 | 7/1990 | Yoshida et al. | 350/350 R |

FOREIGN PATENT DOCUMENTS 63-199319  8/1988  Japan .

*Primary Examiner*—Rolf Hille
*Assistant Examiner*—S. V. Clark

[57] ABSTRACT

In a display device, display electrodes and insulation layers are formed on a pair of substrates with a display layer placed therebetween. In this display device, plural display picture elements are set according to the arrangement state of the display electrodes. In the display picture elements, divisions are set in the insulation layers and different dielectric constants are set for each division. Therefore, the display device has a different impedance in every division within the display picture element and the apparent threshold voltage of each division may be varied. As a result, gradations corresponding to the number of divisions within each display picture element may be displayed.

24 Claims, 10 Drawing Sheets

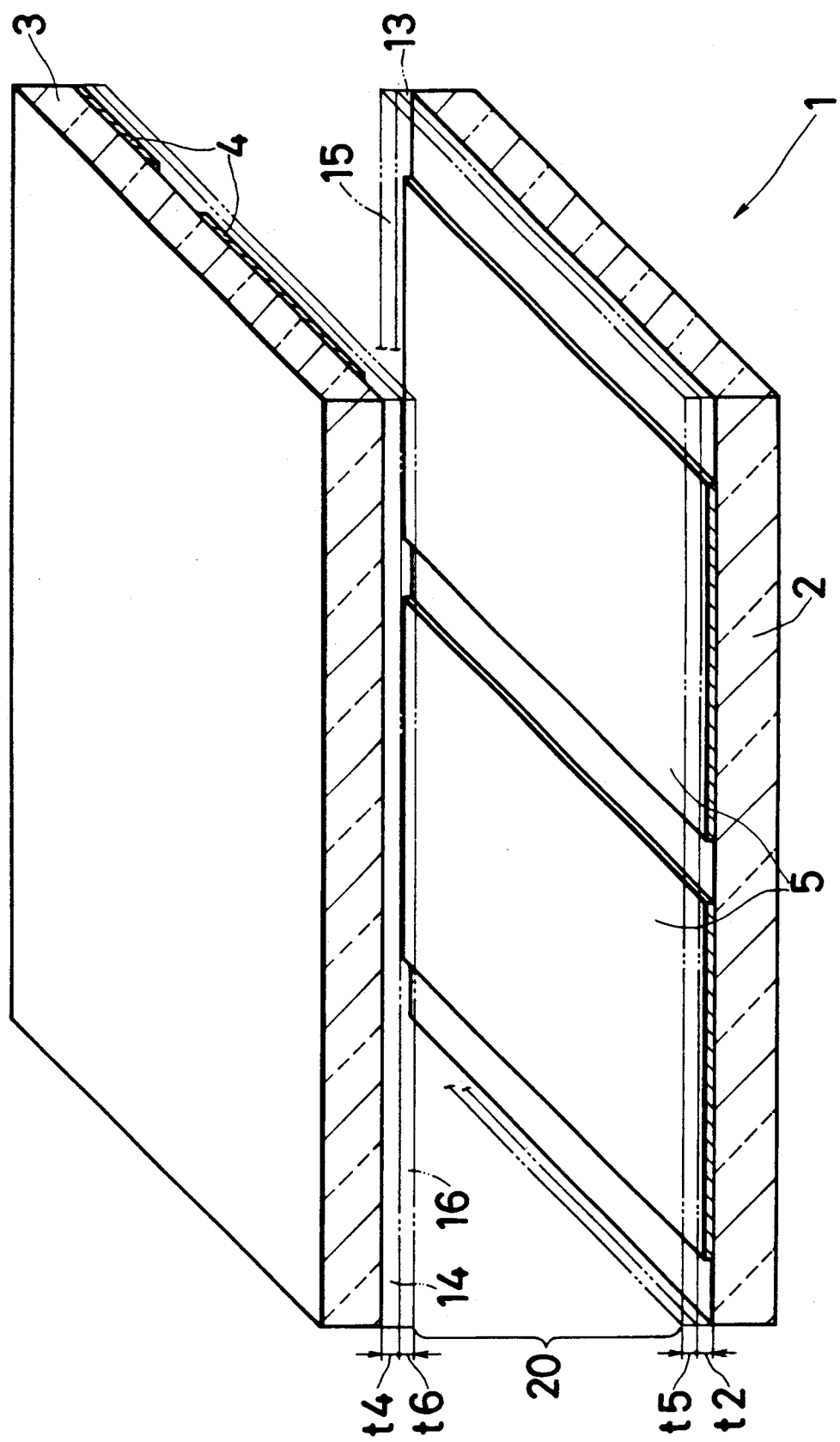

Fig. 4 (1)
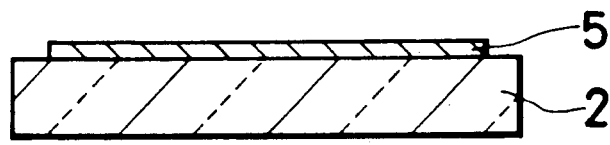
Fig. 4 (2)
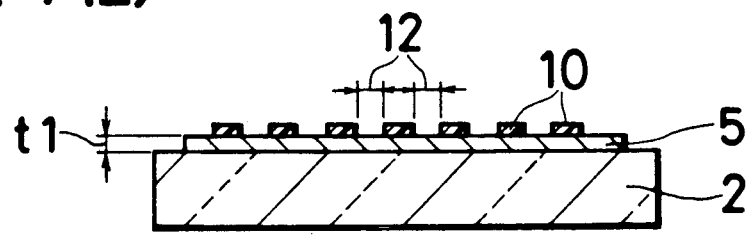
Fig. 4 (3)
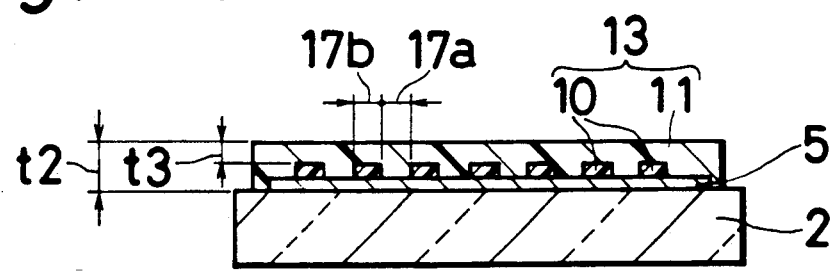
Fig. 4 (4)
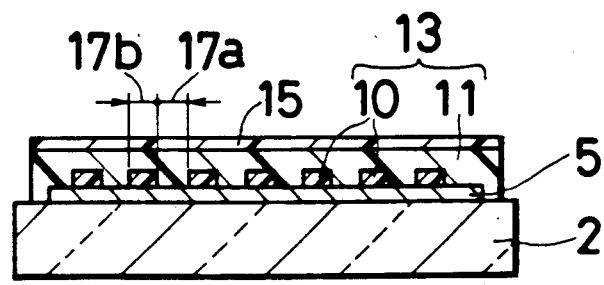

Fig. 5 (1)
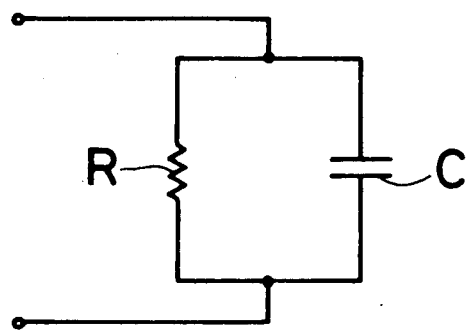
Fig. 5 (2)
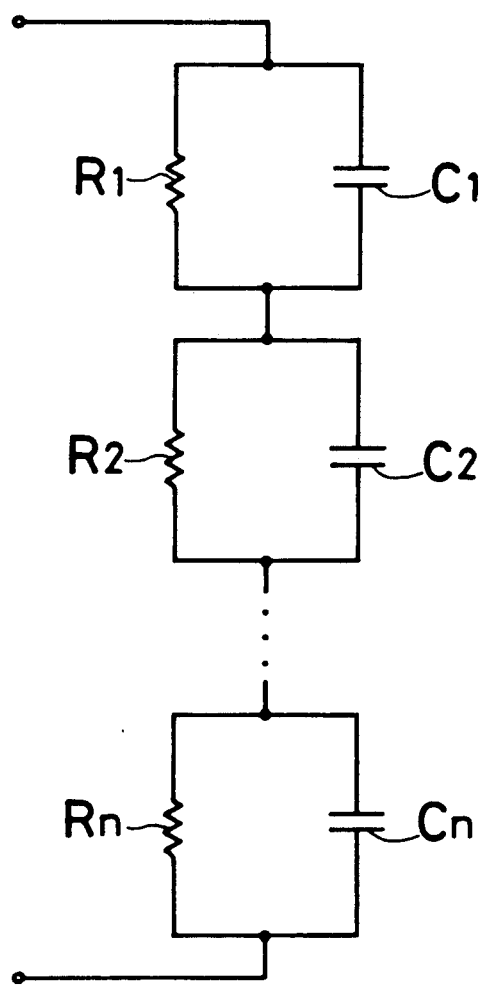

HALF-TONE LIQUID CRYSTAL DISPLAY DEVICE

BACKGROUND OF THE INVENTION

1. Field of the Invention

The present invention relates to a display device, and more particularly to a display device constructed by placing a display layer between electrodes, such as a liquid crystal display device, for realizing halftone display.

2. Description of the Background Art

Liquid crystal display devices are hitherto used widely as display devices in various computers and word processors. The liquid crystal display device is designed to change the liquid crystal between an active state and an inactive state by applying or not applying a voltage across electrodes between which a liquid crystal layer is placed. Whether the liquid crystal is in an active state or in an inactive state depends on whether the applied voltage is above or below the threshold voltage determined by the physical properties of the liquid crystal being used. Thus, the liquid crystal display device is, basically, designed for binary display.

On the other hand, in order to enhance the display quality, there is an increasing demand for technology relating to displaying each picture element in halftone in the liquid crystal display device. In the vicinity of the threshold voltage, there exists an intermediate state between the active state and the inactive state of the liquid crystal, that is, the halftone display state. Such halftone state is a transient state between the active state and inactive state of the liquid crystal and is an extremely unstable state which is difficult to control and use in the halftone display.

Meanwhile, in a liquid crystal display device of, for example, twisted nematic (TN) type for basically presenting binary display as stated above, it is known that halftone display can be spuriously realized by making use of characteristics of the human visual sense.

Conventionally, for realizing such halftone display, the following principles have been known.

1. While a user is recognizing the image in the liquid crystal display device, it is difficult for the user to independently recognize the individual elements of lightness, hue and saturation of each pigment element composing the image. In accordance with this aspect, one picture element of the liquid display device is composed of tiny plural picture elements.

2. According to a visual characteristic of a human, it is impossible to clearly distinguish binary state changes of each picture element of shorter than, for example, 1/10 second. Only the change in the mean brightness in a specific time is recognizable. By making use of this aspect, each picture element is changed over between the active state and the inactive state at very small time intervals of less than 1/10 second.

On the basis of these principles, the apparent halftone display may be realized. As practical techniques utilizing these two principles, the following methods are known. Some of these methods are, however, defined by the present applicant.

(a) Tiling method

Each picture element is composed of plural tiny picture elements, and the display gradation of the picture element is expressed by the ratio of area of the active/inactive portion of the tiny picture element.

(b) Time sharing method

One picture element is displayed in sequential combination of action and inaction in plural frame periods.

(c) Space sharing-averaging method

Mixed method of tiling method and time sharing method.

(d) Multigap method

In the liquid crystal display device of surface stabilized ferroelectric (SSF) type, as shown in the leaflet No. 62-06 "Ferroelectric liquid crystal matrix panel" distributed at the 11th general meeting of the LCD Committee held by the Japan Society for Promotion of Industrial Engineering, a new technology has been proposed in which tiny undulations are formed on the glass substrate, and in which the substrate interval in the display picture element is sloped. By making use of the occurrence and the magnitude of the reversal domain phenomenon at a specific rate depending on the intensity of electric field, the levels of the selective voltage and nonselective voltage are properly selected, so as to realize halftone display.

These conventional methods have their own problems. That is, in the tiling method, the display picture element is relatively large, the entire image is coarse, and the display quality is lowered. For halftone display, moreover, the number of scanning lines and data lines for driving plural picture elements is too large for the number corresponding to display picture elements. To overcome the roughness relating to the display quality, it is necessary to finely machine the electrodes composing the picture element which results in a complicated manufacturing process and an increased number of steps.

In the time sharing method, for example, to display one field of video signals, plural frame scanning times are needed. As a result, depending on the selection of frame frequency, flickers may be formed in the display picture and the display quality is lowered. Also, displaying a fast changing picture such as a moving picture is difficult because of the limitations of the physical properties of the picture elements forming the display device, such as the response speed of the liquid crystal material.

In the space sharing-averaging method, as compared with the above techniques, the number of gradations that can be expressed at identical resolution, or the display picture element density, is increased. However, the same problems as experienced in the tiling method and time sharing method are also present.

In the multigap method, nonuniformity of distribution of liquid crystal layer thickness due to uneven precision in manufacturing, and other nonuniformities of characteristics of the liquid crystal display device are present, and it is difficult to slope the liquid crystal layer thickness to a desired precision within the display picture element of the liquid crystal display device.

SUMMARY OF THE INVENTION

It is hence a primary object of the invention to present a novel display device capable of easily displaying halftone in a simple construction by solving the above-discussed technical problems.

To realize the above object, the invention presents a display device having plural arrays of unit display regions which comprises:

at least a pair of electric insulating substrates having conductive films for defining the unit display regions, between which is placed a display layer possessing a threshold voltage, for changing over between the active state/inactive state, formed on the mutually confronting surfaces thereof, and electric insulating films formed on the mutually confronting surfaces of the electric insulating substrates on which the conductive films are formed, wherein the ratio of the impedance of the electric insulating film of at least one electric insulating substrate to the impedance of the display layer is plural and of mutually different values within each unit display region.

Preferably, the film thickness of the electric insulating film formed between the conductive film and display layer is selected to be equal in each unit display region.

More preferably, the distribution state of the impedance within each unit display region is selected in different states at both sides of each electric insulating substrate holding the display layer.

Preferably, the distribution of impedance in each unit display region is set for at least one side of the electric insulating substrates.

Further preferably, the distribution of impedance within the unit display region based on the electric insulating film layer formed between the conductive film and display layer is selected so as to vary continuously.

Preferably, the distribution of impedance on the basis of the electric insulating film layer formed between the conductive film and display layer is selected so as to vary discontinuously.

More preferably, plural layers of insulating film are formed between the conductive film and display layer, and the shape of each insulating film is selected so as to be mutually different.

Further preferably, any one of the electric insulating film layer and insulating layer formed on the electric insulating substrate is made of an organic compound.

Still preferably, each unit display region contains an electric insulating film formed between the conductive film and display layer and contains a portion individually possessing a mutually different dielectric constant.

Still more preferably, the display layer is composed of twisted nematic liquid crystal material.

Preferably, the display layer is composed of supertwisted nematic liquid crystal material.

Further preferably, the display layer is composed of ferroelectric liquid crystal material.

The display device according to the invention is composed by arranging plural unit display regions. The unit display regions are formed on the mutually confronting surfaces of at least one pair of electric insulating substrates, and their shape is defined by the conductive films holding the display layer which possesses a threshold voltage. On the confronting surface of the electric insulating films on which such conductive films are formed, electric insulating film layers are formed, and the electric insulating film layer of at least one electric insulating substrate is composed so that the ratio of its impedance to the impedance of the display layer may be plural and of mutually different values within the unit display regions.

The threshold voltage of the display layer depends on the impedance of the constituent element between the electrodes, and therefore according to the construction stated herein, when applying a driving voltage to the electrode corresponding to one unit display region, the effective voltage actually applied to the display layer is different, and a tiny display region having an apparently different threshold voltage is formed. Therefore, by properly selecting the voltage applied to the same one unit display region, the area ratio of the tiny display region displayed and driven within the unit display region may be controlled. Hence, a desired medium contrast can be displayed within a unit display region.

In such halftone display, when it is desired to realize display in N gradations (N being a natural number), it is enough to form the tiny display regions differing in impedance in the single unit display region so that the level of the threshold voltage be set in N types. In this case, however, the tiny display regions differing in impedance are formed only in the electric insulating film layer on one electric insulating substrate forming the display device.

When forming such tiny display regions in a structure differing in impedance in the electric insulation film layer on the other electric insulating substrate, the number of elements in the structure differing in impedance formed on the electric insulating substrate is, as a matter of course, smaller. On the other hand, when it is desired to realize the halftone display in continuously varying form, it is formed so that the impedance distribution be continuous in the single unit display region.

According to the invention, the electric insulating film layer of at least one electric insulating substrate is composed so as to have plural mutually different impedances within the portion corresponding to the unit display region. Therefore, when applying a driving voltage to the electrode corresponding to the single unit display region, the effective voltage actually applied to the display layer is different, and tiny display regions having apparently different threshold voltages may be formed. Therefore, by properly selecting the voltage applied to the single unit display region, the area ratio of the tiny display regions displayed and driven within the one unit display region may be controlled. Thus, desired halftone may be displayed within a unit display region.

Further scope of applicability of the present invention will become apparent from the detailed description given hereinafter. However, it should be understood that the detailed description and specific examples, while indicating preferred embodiments of the invention, are given by way of illustration only since various change and modifications within the spirit and scope of the invention will become apparent to those skilled in the art from this detailed description.

BRIEF DESCRIPTION OF THE DRAWINGS

These and other objects of the invention, as well as the features and advantages thereof, will be better understood and appreciated from the following detailed description taken in conjunction with the accompanying drawings which are given by way of illustration only, and thus are not limitative of the present invention, in which:

FIG. 2 is a perspective view showing a section of a liquid crystal display device 1 of the same embodiment.

DETAILED DESCRIPTION OF THE PREFERRED EMBODIMENTS

Figure 1:
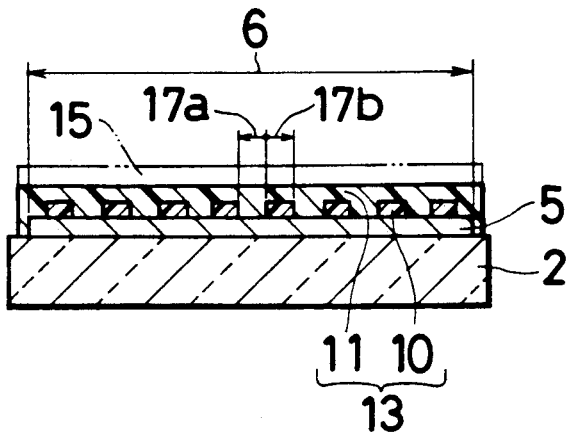
FIG. 1 is a sectional view of a part of an embodiment of the invention.

Referring now to the drawings, some of the preferred embodiments of the invention are described in detail below.

In a liquid crystal display device designed to present binary display in principle, the principle of halftone displaying is firstly considered. Generally, a liquid crystal display device is composed by forming electrodes on a pair of electrically insulating transparent substrates, and forming electric insulating films such as orientation films on the electrodes. The space between these insulating films is filled up with liquid crystal to form a liquid crystal display device.

As further described below, the threshold voltage for changing over the display state of the liquid crystal depends on the impedance of the individual electric insulating films. Therefore, as mentioned above, by locally varying the impedance, the effective voltage actually applied to the liquid crystal may be varied at the time of voltage application, and a portion possessing apparently different threshold voltage may be formed. The insulating film and orientation film disposed between each electrode and liquid crystal layer are respectively regarded as integral electric insulators, and their electric resistance is assumed to be R and capacity to be C, and therefore the equivalent circuit is as shown in FIG. 5 (1). That is, the impedance Z of the electric insulator held by the electrodes is $$Z = \frac{1}{\frac{1}{R} + \frac{1}{-jXc}} \quad (1)$$

$$Xc = \frac{1}{2\pi fC}$$

f driving frequency
$j^2 = -1$.

Supposing $$R \gg 1 \quad (2)$$

and $$C \ll 1, \quad (3)$$

the impedance Z of this electric insulator is expressed in the following formula (4) because the resistance component may be sufficiently ignored.

$$Z = -j\frac{1}{2\pi fC} \quad (4)$$

The synthetic impedance Z when n layers of electric insulators are formed between the electrodes is expressed as follows, assuming the electric resistance of individual electric insulator layers to be Ri, the capacity to be Ci and the impedance of individual electric insulator layers to be (i=1, 2, ..., n)

$$Z = \sum_{i=1}^{n} Zi \quad (5)$$

$$= -j\frac{1}{2\pi f} \sum_{i=1}^{n} \frac{1}{Ci}.$$

Also, assuming the film thickness of each electric insulator layer to be ti and dielectric constant to be $\epsilon i$, the synthetic impedance per unit area Z is $$Z = -j\frac{1}{2\pi f} \sum_{i=1}^{n} \frac{ti}{\epsilon i}. \quad (6)$$

That is, in the electric insulating film formed between each electrode and liquid crystal layer, by locally varying the dielectric constant, a distribution of impedance may be obtained.

Figure 6:
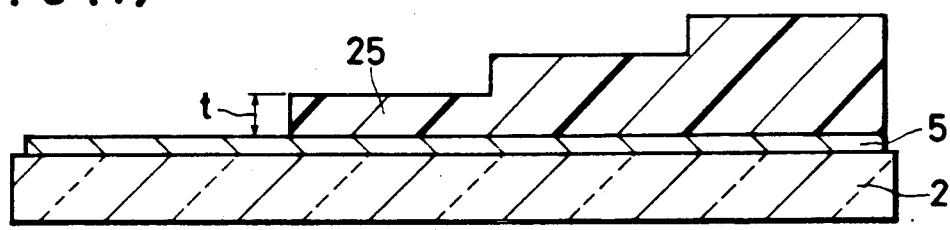
Figure 6:
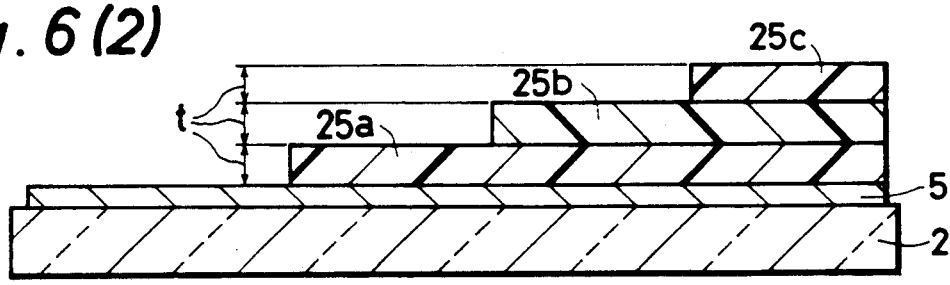
Figure 6:
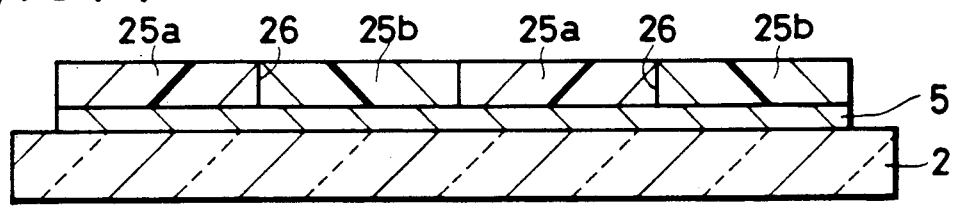
Figure 6:
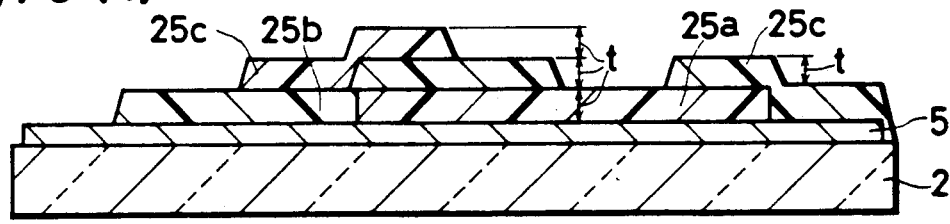
Figure 6:
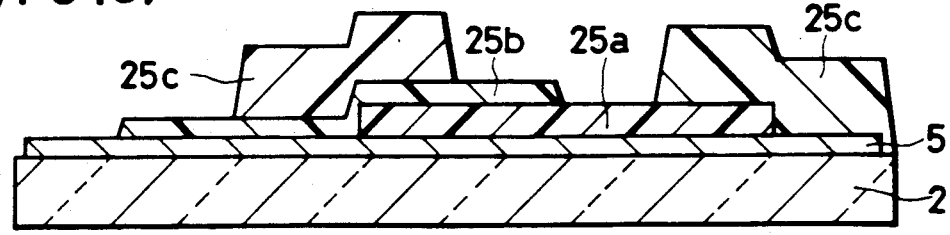

As methods for locally varying the impedance, examples are shown in FIG. 6 (1) to (5). That is, in FIG. 6 (1), an insulating film 25 is formed on a band electrode 5, and the film thickness t is locally varied. In FIG. 6 (2), insulating films 25a, 25b, 25c of same film thickness t are laminated and formed, and the number of laminates is varied locally.

In the example of FIG. 6 (3), a patterned first insulation film 25a is formed on the band electrode 5, and the gaps 26 formed in the insulating film 25a are filled up with a second insulating film 25b differing in dielectric constant. In FIG. 6 (4), plural types of insulating films 25a, 25b, 25c differing mutually in dielectric constant with film thickness of t are laminated and formed on the band electrode 5. That is, the combination of the materials of the insulating films to be laminated varies locally. In FIG. 6 (5), plural types of insulating films 25a, 25b are laminated on the band electrode 5, and the film thickness of each material or the number of laminates is changed locally.

In any one of the above techniques, it is possible to obtain an insulating film differing locally in dielectric constant and hence locally differing in impedance. In such methods it is necessary to form a leveling film on the surface of the insulating film 25 due to the reason of required flatness in the surface facing the liquid crystal layer for the purpose of regularity of the orientation direction of liquid crystal molecules.

Figure 3:
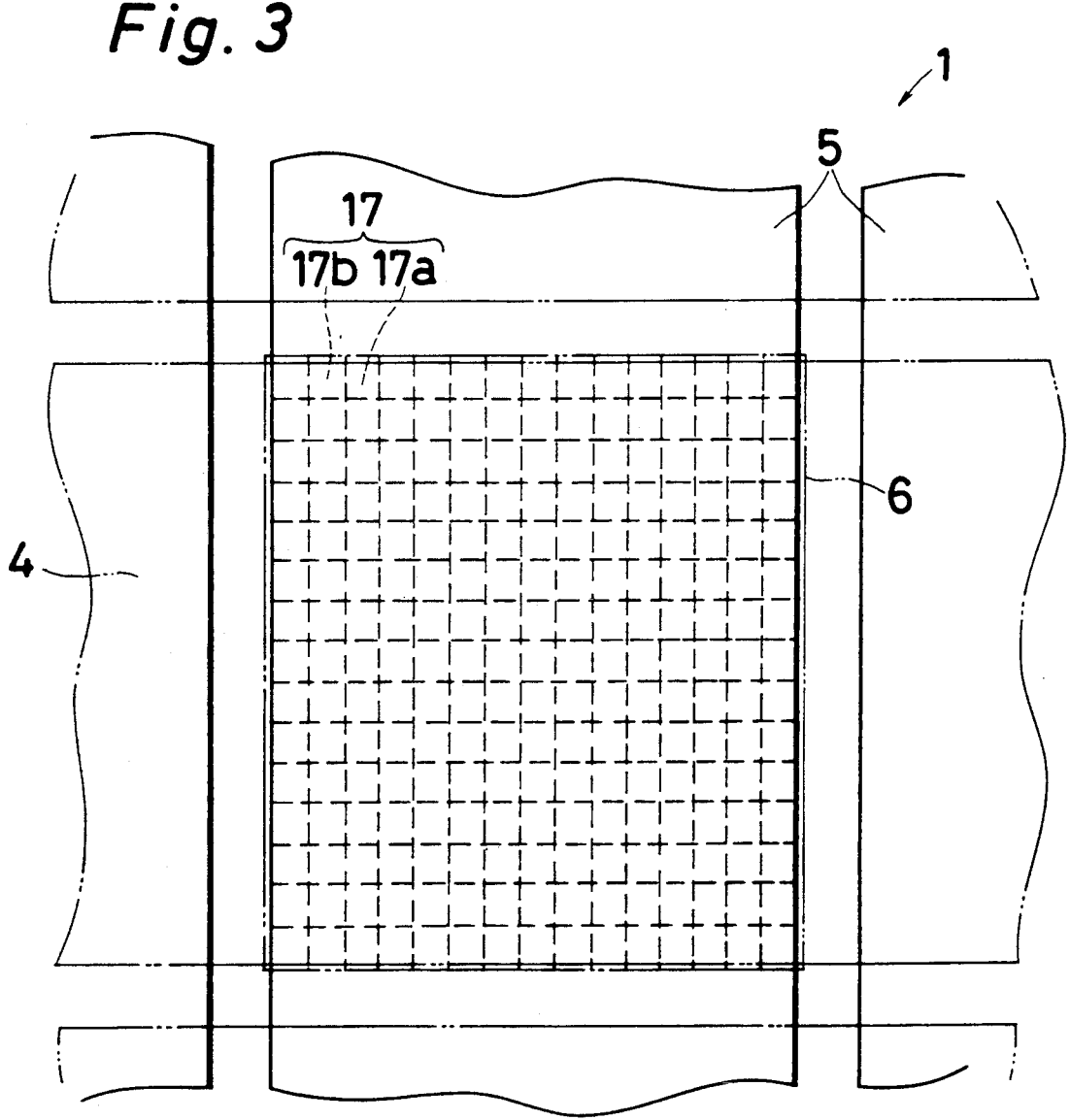
FIG. 3 is a plan view of a substrate, FIG. 4(1), 4(2), 4(3) and 4(4) are sectional views, showing manufacturing processes of the liquid crystal display device 1, FIG. 5(1) and 5(2) are circuit diagrams illustrating the principle of this invention, FIG. 6(1), 6(2), 6(3), 6(4) and 6(5) are sectional views showing a structural example of the invention.

FIG. 1 is a sectional view of a part of a liquid crystal display device 1 in a simple matrix form in an embodiment of the invention, FIG. 2 is a perspective view showing a partial section of the liquid crystal display device 1, FIG. 3 is a plan view of the liquid crystal display device 1, and FIG. 4 is a sectional view showing steps of manufacturing the liquid crystal display device 1. Referring to these drawings, the liquid crystal display device 1 is explained below. To manufacture the liquid crystal display device 1, in the first place, electric insulating substrates (hereinafter called substrates) 2, 3 made of transparent material such as borosilicate glass are prepared.

On the substrate 2 at one side, a thin film made of material having both transparency and conductivity, for example, ITO (indium tin oxide) is formed, and a pattern is formed by etching or similar technique, thereby composing each electrode. The same is applied to the substrate 3. That is, on the substrate 3, for example, band electrodes 4 stretching in the lateral direction in FIG. 2 are formed in plural rows, and on the substrate 2, band electrodes 5 stretching in the direction vertical to the band electrodes 4 are formed in plural rows. The intersections of the band electrodes 4, 5 are formed as picture element regions 6 as unit display regions. The sectional view in the step of forming such band electrodes 5 is shown in FIG. 4 (1).

On the substrate 2 on which such band electrodes 5 are formed, an insulating film possessing impedance distribution is formed. In this embodiment, in fabrication of electric insulating film possessing impedance distribution, an example of using tantalum oxide and acrylic resin is explained below. A tantalum thin film is formed by sputtering on the substrate 2. That is, by the plasma etching process by fluorocarbon ($CF_4$), the thin film is patterned, and the obtained tantalum thin film is oxidized to form a first insulating layer 10 with a layer thickness of t1 (for example, 500 Å) as shown in FIG. 4 (2), by the tantalum oxide with the relative dielectric constant k1.

An acrylic resin of relative dielectric constant k2 is, for example, applied thereon by spin coating or roll coating to obtain a second insulating layer 11 as shown in FIG. 4 (3). The second insulating layer 11 possesses a layer thickness t2 (for example 1500 Å) in the portion free from the first insulating layer 10, and a layer thickness t3 (for example, 1000 Å) in the portion with the first insulating layer 10.

Here, in this embodiment, the second insulating layer 11 also functions as a so-called leveling film. That is, the second insulating layer 11 fills up the gap 12 of the patterned first insulating layer 10, and the opposite side surface to the substrate 2 are formed to be flat surfaces parallel to the substrate 2. Such function of the leveling film is intended to prevent disturbance in the orientation of the liquid crystal molecules due to local nonuniform layer thickness of the liquid crystal layer 20 functioning as the display layer filled up between the substrates 2, 3, and by making uniform the layer thickness of the liquid crystal layer 20. The threshold voltage for displaying and driving the liquid crystal layer 20 may be easily calculated without having to pay attention locally to the layer thickness of the liquid crystal layer 20.

Out of the first insulating layer 10 and second insulating layer 11, a first insulating film 13 locally differing in impedance is formed as an electric insulating film. On the substrate 3 on the opposite side, silicon dioxide $SiO_2$ of relative dielectric constant of, for example k3 is formed in a layer thickness of t4 (for example, 1000 Å) by sputtering as a second insulating film 14.

When forming an orientation film 15 on the substrate 2 in this stage, by surface treatment the phenomenon of dislocation of the orientation film material on the substrate 3 as described below is prevented on the substrate 3 in the manufacturing step shown in FIG. 4 (3), and the bonding performance on the substrate 3 of the orientation film material is improved. As a result, the orientation film may be applied in a uniform thickness. After surface treatment mentioned above, m-cresol solution of nylon 66 (tradename) with relative dielectric constant k4 is applied by spin coating, and is baked for 1 hour at, for example 150° C. On the other substrate 2, the orientation film 16 is formed in the similar manufacturing steps.

These orientation films 15, 16 respectively possess layer thicknesses t5, t6 (for example, 1000 Å each), and rubbing treatment is applied by using, for example, nylon cloth so that the directions of orientation on the substrates 2, 3 may be parallel to each other when the liquid crystal display device 1 is assembled. The state of the substrate 2 on which the orientation film 15 is formed in this way is shown in FIG. 4 (4).

On the substrates 2, 3 on which orientation films 15, 16 are formed in this way, silica beads of 2 μm in diameter are sprinkled, and the both substrates 2, 3 are adhered together by thermosetting epoxy resin, and the gap is filled with liquid crystal material (for example, ZLI-3488 of Merck) to seal tightly. Afterwards, a pair of polarizer plates in cross nicol state are affixed to both sides of the substrates 2, 3. In this manner, the liquid crystal display device 1 is composed.

Meanwhile, examples of numerical values of the relative dielectric constants k1 to k4 are as shown in Table 1.

TABLE 1

| Material | Relative dielectric constant |
| --- | --- |
| Tantalum oxide | 20.0[1] |
| Acrylic resin | 2.63[2] |
| Nylon | 3.45[2] |
| $SiO_2$ | 3.80[1] |

[1] Measured value or calculated from measured value.
[2] Excerpts from "Electronic Material Handbook" ed. M. Wada, Asakura Shoten (1970).

The dielectric constant of each material is expressed as follows.

$$\epsilon = \kappa \times \epsilon 0 \quad (7)$$

where ϵ0: dielectric constant in vacuum ($8.85418782 \times 10^{-12}$ F/m)

The first insulation film 13 of the liquid crystal display device 1 is composed of the portion consisting only of the second insulating layer 11 relating to the voltage application direction (the vertical direction in FIG. 1) at the time of display drive, and the portion forming laminate structure with the second insulating layer 11 and the first insulating layer 10, in mutually arranged structure. The portion consisting only of the second insulating layer 11 is hereinafter called a first picture element region 17a, and the laminate structure portion is called a second picture element region 17b, and when they are collectively called the picture element region, it is expressed by the reference numeral 17. That is, the picture element region 6 shown in FIG. 1 is composed of plural first and second picture element regions 17a, 17b.

Figure 7:
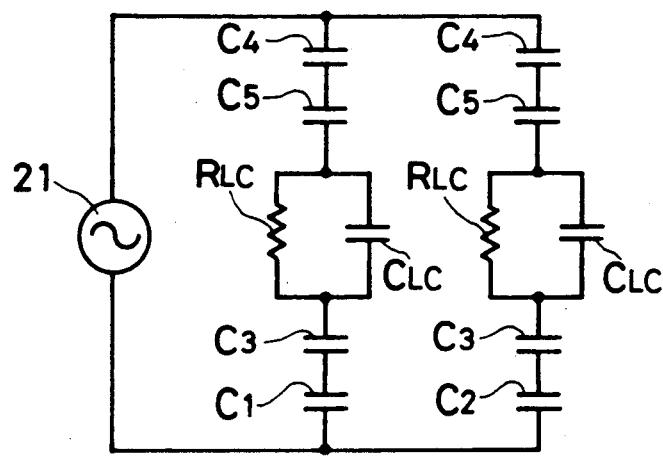
FIG. 7 is an equivalent circuit diagram of a liquid crystal display device 1, FIG. 8(1) and 8(2) are graphs showing the characteristics of the liquid crystal display device 1.

FIG. 7 is an equivalent circuit diagram of the liquid crystal display device 1. Referring to a pair of the first picture element region 17a and second picture element region 17b on the substrate 2, in the first insulation film 13, the portion corresponding to the first picture element region 17a possesses a capacity $C_1$, the portion corresponding to the second picture element region 17b a capacity $C_2$, and the portion corresponding to the orientation film 15 a capacity $C_3$. Relating to the substrate 3, the second insulation film 14 possesses a capacity $C_4$ and the orientation film 16 a capacity $C_5$. As for the liquid crystal layer 20, its electric resistance is assumed to be $R_{LC}$, and capacity to be $C_{LC}$. At this time, the equivalent circuit relating to the first picture element region 17a and the second picture element region 17b is composed as shown in FIG. 7.

Within the range of the first picture element region 17a, the impedance combining the orientation film 15 and insulation film 13 (also leveling film if formed) is assumed to be $Z_1$, and the similar impedance of the second picture element region 17b to be $Z_2$. In the liquid crystal display device 1 of this embodiment, since the film thickness of the liquid crystal layer 20 is uniform, the impedance of the liquid crystal layer 20 is always $Z_{LC}$ regardless of the location, and the threshold voltage for actually displaying and driving the liquid crystal is assumed to be Vc, then the threshold voltage of the degree of the transmitted light of intermediate level $V_H$ is $$V_H = Vc \times \frac{Z_{LC} + Z_1}{Z_{LC}} \quad (8)$$

and the threshold voltage in active state $V_F$ is $$V_F = Vc \times \frac{Z_{LC} + Z_2}{Z_{LC}} \quad (9)$$

That is, it is understood that the threshold values $V_H$, $V_F$ are defined by the impedances $Z_1$, $Z_2$.

At this time, the impedances $Z_1$, $Z_2$, $Z_{LC}$ are calculated as follows. Relating to the substrate 2, the dielectric constants of the first insulation film 13 corresponding to the first and second picture element regions 17a, 17b are assumed to be $\epsilon_1$, $\epsilon_2$, the film thickness to be $d_1$, $d_2$; the dielectric constant of the second insulation film 14 relating to the substrate 3 to be $\epsilon_3$; the film thickness to be $d_3$; the dielectric constants of the orientation films 15, 16 to be $\epsilon_4$, $\epsilon_5$; the film thicknesses to be $d_4$; $d_5$ respectively; the dielectric constant of the liquid crystal itself to be $\epsilon_{LC}$; the resistance to be $R_{LC}$; and the layer thickness of the liquid crystal layer 20 to be $d_{LC}$. Where the leveling film is formed, the film thicknesses are assumed to be $d_{L1}$, $d_{L2}$, and the dielectric constants to be $\epsilon_{L1}$, $\epsilon_{L2}$. At this time, the impedances $Z_1$, $Z_2$, $Z_{LC}$ are expressed as follows.

$$Z_1 = \frac{1}{\omega} \times \left( \frac{d_{L1}}{\epsilon_{L1}} + \frac{d_1}{\epsilon_1} + \frac{d_3}{\epsilon_3} + \frac{d_4}{\epsilon_4} + \frac{d_5}{\epsilon_5} \right) \quad (10)$$

$$Z_2 = \frac{1}{\omega} \times \left( \frac{d_{L2}}{\epsilon_{L2}} + \frac{d_2}{\epsilon_2} + \frac{d_3}{\epsilon_3} + \frac{d_4}{\epsilon_4} + \frac{d_5}{\epsilon_5} \right) \quad (11)$$

$$Z_{LC} = \frac{1}{\omega} \times \frac{d_{LC}}{\epsilon_{LC}} \quad (12)$$

where $\omega$: angular frequency of driving voltage of power supply 21.

By thus forming plural picture element regions 17a, 17b differing in dielectric constant in the picture element region 6, mutually different threshold voltages $V_F$, $V_H$ can be set in these picture element regions 17a, 17b. Meanwhile, in the equivalent circuit diagram shown in FIG. 7, the resistance components of the orientation films 15, 16 and insulation films 13, 14 are ignored.

Figure 8:
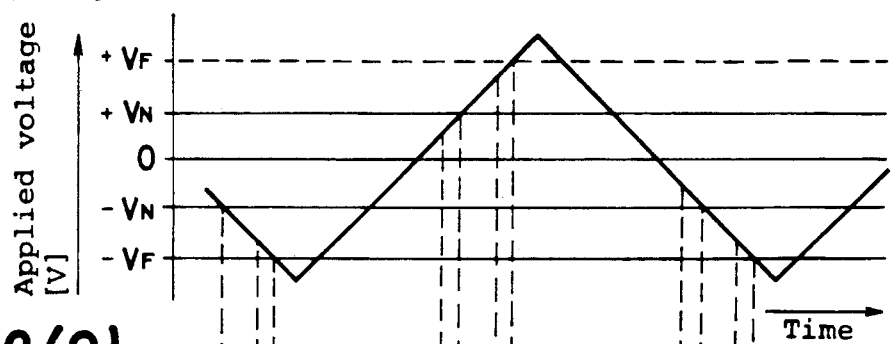
Figure 8:

FIG. 8 is a graph illustrating the characteristics of the liquid crystal display device 1. To the liquid crystal device 1 composed in this way having a film thickness of the liquid crystal layer 20 of, for example, 2 μm, triangular waves (e.g. 250 Hz) as shown in FIG. 8 (1) were applied. At this time, the changes in the intensity of the transmitted light were measured, and the results are shown in FIG. 8 (2). As clear from the diagram it is understood that the liquid crystal display device 1 realizes three stable operating states, that is, the state of completely transmitting the light, the intermediate transmitting state, and the non-transmitting state.

The measured values and calculated values of the threshold voltage in the complete transmission state and intermediate transmission state are comparatively shown in Table 2.

TABLE 2

|  | Measured | Calculated |
|---|---|---|
| Intermediate transmission state | 7.97 | 8.04 |
| Complete transmission state | 8.20 | 8.28 |

The intermediate transmission light intensity shown in FIG. 8 (2) is set around 50%, and this is attributable to the structure of the liquid crystal display device 1 in this embodiment, that is, the first picture element regions 17a and the second picture element regions 17b are nearly of the same number, and by varying their constituent ratio, a desired transmission light intensity may be set as an intermediate stage.

The liquid crystal display device 1 in the foregoing embodiment is designed so as to be formed of the first and second picture element regions 17a, 17b having mutually different dielectric constants $\epsilon_1$, $\epsilon_2$ in the picture element region 6. When desired to realize a distribution of three or more impedances or five or more impedances, for example in the construction shown in FIG. 2, the composition of the insulator portion existing between the band electrodes 4, 5 and the liquid crystal layer 20 is required to possess structures as shown in FIG. 6 (1) to (5). Actually, for controlling the impedances in five gradations, the structures in FIG. 6 (4) and (5) are preferable.

To form such multiple-layer insulation film layer structure, the lift-off method is desired. In the lift-off method, a resist film is formed and patterned in each layer, and a desired insulation film is formed thereon, and the resist film is removed by using a proper solvent, so that the insulation film on the resist pattern may be removed at the same time.

Figure 9:
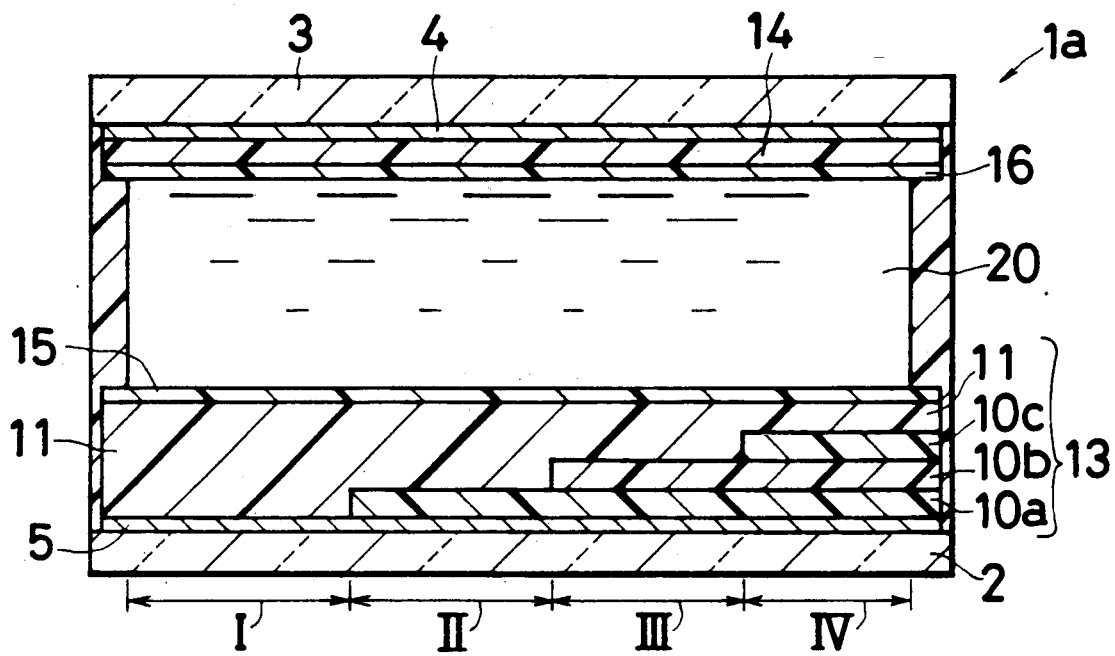
FIG. 9 is a sectional view showing other embodiment of the invention.

A liquid crystal display device 1a of such multiple-layer structure as shown in FIG. 9 was formed. This structure is similar to the example shown in FIG. 1 to FIG. 3, and band electrodes 5, 4 are formed on substrates 2, 3, and second insulation film 14 and orientation film 16 are formed on the band electrode 4. On the other band electrode 5, insulating layers 10a, 10b, 10c of same film thickness made of, for example, tantalum oxide are sequentially laminated and formed. These insulating layers 10a to 10c are formed of mutually different sizes, and an insulating layer 11 made of acrylic or other material is formed so as to cover them all. This insulating layer 11 also functions as leveling film.

In this formed liquid crystal display device 1a, regions I, II, III, IV are of mutually different dielectric constants, hence, impedances are formed in a first insulation film 13 formed of the insulating layers 10a to 10c, 11. The measured value and calculated value of threshold voltage in the regions I to IV are shown in Table 3.

TABLE 3

|  |  | Measured | Calculated |
|---|---|---|---|
| Bright | Region I | 8.52 | 8.60 |
| ↑ | Region II | 8.38 | 8.46 |
| ↓ | Region III | 8.24 | 8.32 |
| Dark | Region IV | 8.14 | 8.18 |

As known from these results, the difference in threshold voltage among the regions I to IV is not so great as compared with the partial voltage in the liquid crystal layer 20 because the impedance of the liquid crystal material itself is relatively large. However, when a driving voltage is applied to the band electrodes 4, 5, the value is not so small as to operate in the bias wave applied state, and therefore even the threshold voltage in the distribution as shown in Table 3 is sufficient for display in five gradations.

Figure 10:
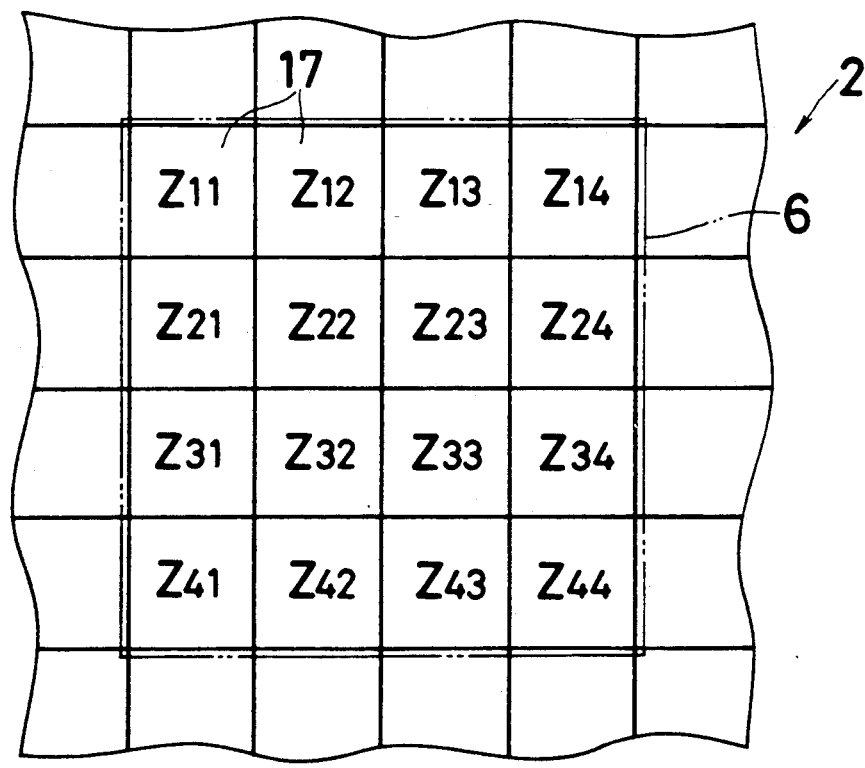
FIG. 10 is a plan view showing a structural example of the other embodiment of the invention.

On the other hand, when desired to display in more gradations, for example, in 16 gradations, the picture element region 6 in the liquid crystal display device 1 is divided into, for example, 4 lines and 4 rows to form 16 picture element regions 17 as shown in FIG. 10. Assuming the impedances of the insulation film 13 and others with respect to each one of the picture element regions 17 to be Zij (i=1 to 4, j=1 to 4, all of Zij being mutually different values), 16 gradations can be displayed is one picture element region 6.

At this time, the impedances $Z_{11}$ to $Z_{44}$ are desired to be selected so as to satisfy the following relation.

$$Z_{32} < Z_{23} < Z_{22} < Z_{33} < Z_{43} <$$ (13)

$$Z_{21} < Z_{13} < Z_{12} < Z_{31} < Z_{42} <$$

$$Z_{24} < Z_{11} < Z_{41} < Z_{14} < Z_{44} < Z_{34}$$

That is, in the distribution of impedance Zij satisfying the above relation, the threshold voltage of each one of the picture element regions 17 may be easily calculated on the basis of the structure of the insulating film layer in the region corresponding to each picture element region 17. Moreover, when desired to realize these plural impedances Zij by the laminate structure of the first insulation film 13 in the first embodiment, the patterning work of the insulating layers for composing such first insulation film 13 is easy.

Figure 11:
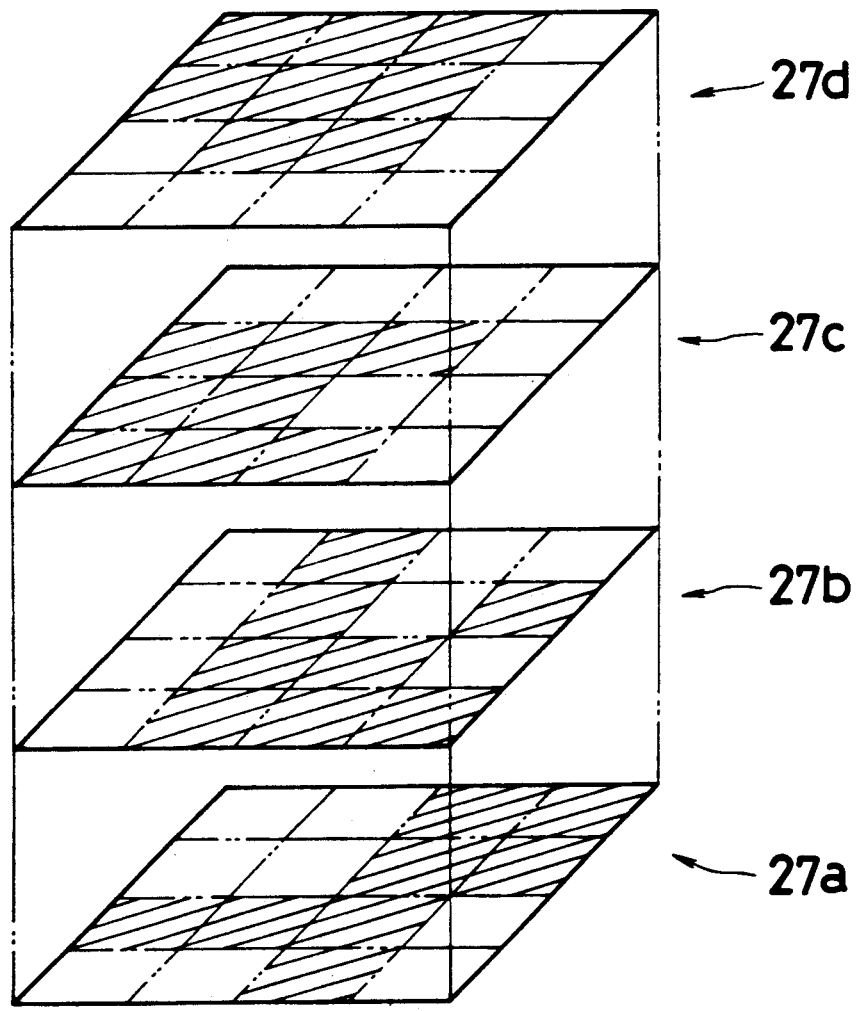
FIG. 11 is a perspective view showing another structural example of the invention.

In other words, when forming the above impedance distribution by the first insulation film 13 in the liquid crystal display device 1, the first insulation film 13 is formed, for example, in four layers. That is, as shown in FIG. 11, the first insulation film 13 is formed by laminating, on the band electrode 5, the first insulating layer 27a, second insulating layer 27b, third insulating layer 27c, and fourth insulating layer 27d. At this time, when each one of the insulating layers 27a to 27d is equally divided into 16 sections, the insulating material is formed only in the shaded sections in FIG. 11, while the insulating material is not formed on the other sections. By such structure, the impedance distribution satisfying the condition of formula (13) may be obtained.

Figure 12:
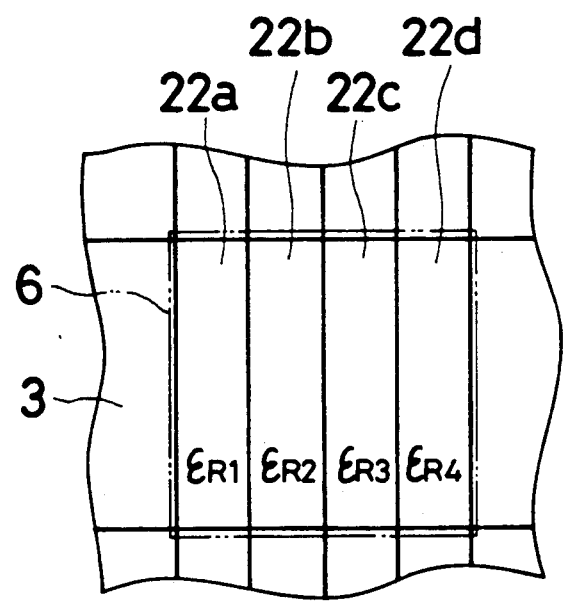
FIG. 12 and FIG. 13 are plan views showing structural examples of different embodiments of the invention.
Figure 13:
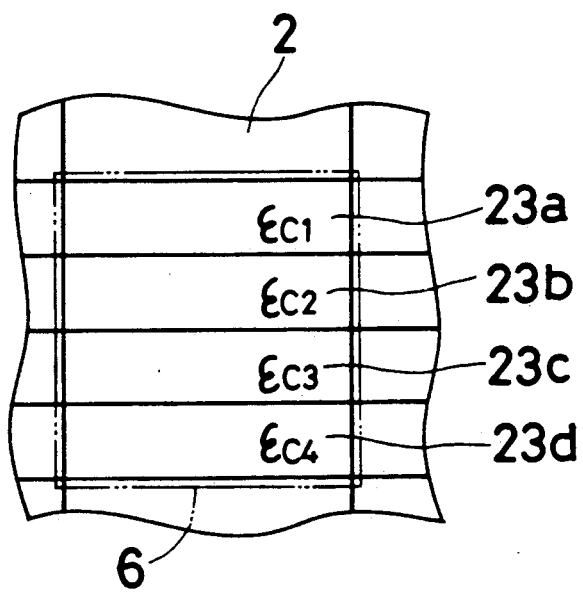

In the two foregoing embodiments, meanwhile, the first insulation film 13 having the impedance distribution is formed only on the substrate 2 contained in the liquid crystal display devices 1, 1a, but the structure having impedance distribution may be provided also in both insulation films 13, 14 on the substrates 2, 3. In such a case, when desired to display in 16 gradations as shown in FIG. 10, for example, rectangular regions 22a, 22b, 22c, 22d possessing dielectric constants $\epsilon_{R1}$, $\epsilon_{R2}$, $\epsilon_{R3}$, $\epsilon_{R4}$ as shown in FIG. 12 are formed in the portion corresponding to the picture element region 6 of the second insulation film 14 on the substrate 3, while rectangular regions 23a to 23d possessing dielectric constants $\epsilon_{c1}$, $\epsilon_{c2}$, $\epsilon_{c3}$, $\epsilon_{c4}$, being extended in the direction orthogonal to the rectangular regions 22 as shown in FIG. 13 are formed in the portion corresponding to the picture element region 6 of the first insulation film 13 on the substrate 2.

When thus formed substrates 2, 3 are combined, the picture element region 17 as shown in FIG. 10 may be realized.

In these embodiments, when providing the insulation films 13, 14 with the structures possessing partly and mutually different impedances, the electric insulating materials differing in the dielectric constants were formed in thin film by sputtering or another method, and were patterned by a patterning technique, and plural types of insulation films were properly combined to set up a laminate structure, thereby obtaining the desired impedance distribution. On the other hand, besides, as the technique for providing such impedance distribution, after forming insulation films 13, 14 made of single material, ions or the like may be dispersed in the insulation films 13, 14, and these ions may be diffused in the insulation films by heating or other means, and thus the technique for realizing the impedance distribution is not limited whatsoever. In the foregoing embodiments, the mode of distribution of impedance was to set discrete and different impedances in each picture element region 17, but it is also possible to vary the impedance continuously over plural picture element regions 17. Such impedance distribution is realized, for example, by continuously varying the dielectric constant by the ion diffusion method or the like.

Moreover, in these embodiments, the structure of the insulation films 13, 14 possessing impedance distribution was realized as shown in FIG. 1, wherein the patterned first insulating layer 10 and unpatterned second insulating layer 11 are laminated on the substrate 2 on which the picture element region 6 is composed. The second insulating layer 11 is provided with the function of a leveling film, and the orientation film 15 is formed thereon.

Figure 14:
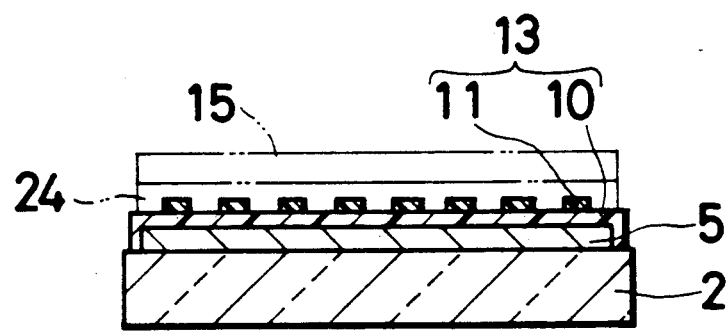
FIG. 14 is a sectional view showing the structure of a still different embodiment of the invention.

Instead of such structure, as shown in FIG. 14, a first insulating layer 10 is formed on the entire surface of a picture element electrode 7 on a substrate 2, and it is not patterned. Next, a second insulating layer 11 is formed on the first insulating layer 10, and patterning is treated the same as in the first conductive layer 10 shown in FIG. 1. In this way, the first insulation film 13 possessing impedance distribution will be obtained. On the other hand, in such structure as in this example, since the surface of the first insulation film 13 is inducted due to the patterned second insulating layer 11, a leveling film 24 made of, for example, acrylic resin, is formed. An orientation film 15 is formed thereon. In such constitution, too, the same effects as in the foregoing embodiments will be obtained.

Figure 15:
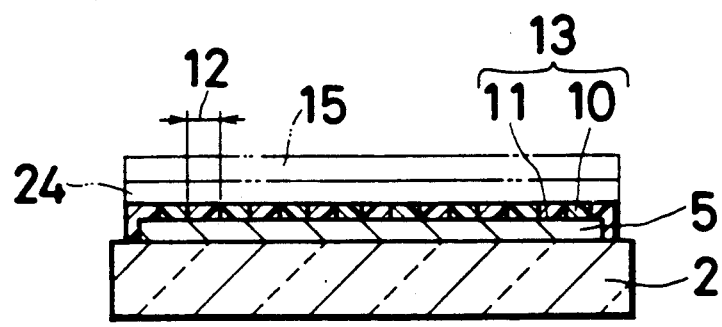
FIG. 15 is a sectional view showing the structure of still another embodiment of the invention.

In a further different method of construction, as shown in FIG. 15, a first insulating layer 10 is patterned and formed on a substrate 2, and a second insulating layer 11 is formed so as to fill up gaps 12. Thus, the same state as in FIG. 1 is achieved, and furthermore, the second insulating layer 11 is patterned to obtain the shape as shown in FIG. 15. In this case, too, it is desired to form a leveling film 25 on the first insulation film 13, and an orientation film 15 is formed thereon. Also in such constitution, the same effects as in the foregoing embodiments will be obtained.

In the above embodiments, as the materials for forming the insulation films 13, 14 on the substrates 2, 3, the first insulation film 13 was made of tantalum oxide and nylon 66, while the second insulation film 14 was made of silicon oxide. This invention, however, is not limited to such materials alone, and any materials may be used alone or in combination as far as they are electrically insulating materials differing in dielectric constant.

The second insulation film 14 may be also made of one of the electrically insulating materials of the first insulation film 13. Where the second insulation film 14 is formed to possess a dielectric constant distribution, the plural types of electrically insulating materials of the second insulation film 14 may be selected from either the plural types of electrically insulating materials of the first insulation film 13, or completely different materials.

In other embodiments of the invention, in the structure as shown in FIG. 1, by properly selecting the materials and the forming step of the second insulating layer 11 for forming the first insulation film 13, it may be used as an orientation film. In this case, the orientation treatment is applied to the surface of the second insulating layer 11.

Yet, in these embodiments, mutually different dielectric constants are set so as to set mutually different impedances in each one of picture element regions 17, but the impedance setting technology is not limited, and may include, for example, a method of varying the electric resistance.

As the liquid crystal materials in the foregoing embodiments, the SSF type liquid crystal is formed, but the invention is not limited to such liquid crystal material alone, and may be applied to any other liquid crystal material such as TN liquid crystal and STN liquid crystal.

The display device in the invention is disclosed, in the description of the embodiments herein, as a liquid crystal display device, but the invention is not limited to such disclosure, but may be applied in any other display devices satisfying the conditions designated in the claims hereinbelow, such as in electroluminescence display devices.

The invention may be embodied in other specific forms without departing from the spirit or essential characteristics thereof. The present embodiments are therefore to be considered in all respects as illustrative and not restrictive. The scope of the invention being indicated by the appended claims rather than by the foregoing description and all changes which come within the meaning and the range of equivalency of the claims are therefore intended to be embraced therein.

What is claimed is:

1. A display device having plural arrays of unit display regions each comprising:
   at least a pair of electric insulating substrates having conductive films for defining the unit display regions, between which is placed a display layer possessing a threshold voltage for changing over an active state/inactive state, formed on mutually confronting surfaces thereof, said display layer of uniform thickness within each of the unit display regions; and
   electric insulating films formed on the mutually confronting surfaces of said electric insulating substrates on which said conductive films are formed,
   the ratio of impedance of said electric insulating film of at least one of said electric insulating substrates to impedance of said display layer is plural and of mutually different values within each unit display region.

2. The display device according to claim 1, film thickness of said electric insulating films formed between said conductive films and display layers are equal in each of the unit display regions.

3. The display device according to claim 1, a distribution state of the impedance within each of the unit display regions is selected in different states of both sides of each of said electric insulating substrates bounding said display layers.

4. The display device according to claim 1, a distribution of impedance within each of the unit display regions is set for at least one side of said electric insulating substrates.

5. The display device according to claim 1, a distribution of impedance within each of the unit display regions based on said electric insulating films formed between said conductive films and display layers varying continuously.

6. The display device according to claim 1, a distribution of impedance within each of the unit display regions based on said electric insulating films formed between said conductive films and display layers varying discontinuously.

7. The display device according to claim 1, plural layers of said insulating films being formed between said conductive films and display layers, a shape of each of said insulating films being selected as mutually different.

8. The display device according to claim 1 or 7, any one of said electric insulating films formed on the electric insulating substrate is an organic compound.

9. The display device according to any one of claim 1-7, each of the unit display regions including said electric insulating films formed between said conductive films and display layer containing individual portions possessing mutually different dielectric constants.

10. The display device according to claim 1, said display layers being composed of twisted nematic liquid crystal material.

11. The display device according to claim 1, said display layers being composed of supertwisted nematic liquid crystal material.

12. The display device according to claim 1, said display layers being composed of ferroelectric liquid crystal material.

13. A display device having plurally arranged unit display regions comprising:
   first and second insulating substrates, said first insulating substrate including a plurality of first band electrodes formed parallel with respect to each other in a first direction and said second insulating substrate including a plurality of second band electrodes formed parallel with respect to each other in a second direction perpendicular to said first direction, said first and second band electrodes formed on respective mutually confronting surfaces of said first and second insulating substrates, mutually intersecting confronting portions of said first and second band electrodes forming the unit display regions; and a display layer, disposed between said first and second insulating substrates, capable of being switched between an active or inactive state based upon respective potentials applied across said first and second band electrodes, at least one of said first and second band electrodes of each of said unit display regions having insulating films formed thereon, each of said insulating films including a plurality of portions of mutually different impedance, said display layer being of uniform thickness throughout the display device.

14. The display device of claim 13, each of said first and second band electrodes being planar.

15. The display device of claim 14, film thickness of each of said plurality of portions of said insulating films within each of the unit display regions being mutually different.

16. The display device of claim 14, each of said insulating films being formed of a plurality of laminated insulating layers of thickness t, the number of laminated insulating layers of each of said plurality of portions of said insulating films within each of the unit display regions being mutually different.

17. The display device of claim 14, said plurality of portions of said insulating films for each of the unit display regions being comprised of alternating portions of first and second insulating layers of thickness t of different first and second dielectric constants, respectively.

18. The display device of claim 14, each of said insulating films being formed of a plurality of laminated insulating layers of thickness t and mutually different dielectric constants, each of said plurality of portions of said insulating films within each of the unit display regions being formed of mutually different combinations of laminated insulating layer number and dielectric constant.

19. The display device of claim 14, each of said insulating films being formed of a plurality of laminated insulating layers of different thickness, each of said plurality of portions of said insulating films within each of the unit display regions being formed of mutually different combinations of laminated insulation layer thickness and number.

20. The display device of claim 13, further comprising a leveling film formed on the surface of said insulating films.

21. The display device of claim 20, said display layer being comprised of twisted nematic liquid crystal material.

22. The display device of claim 20, said display layer being comprised of supertwisted nematic liquid crystal material.

23. The display device of claim 20, said display layer being comprised of ferroelectric liquid crystal material.

24. A display device having plurally arranged unit display regions comprising:

first and second insulating substrates, said first insulating substrate including a plurality of first planar band electrodes formed parallel with respect to each other in a first direction and said second insulating substrate including a plurality of second planar band electrodes formed parallel with respect to each other in a second direction perpendicular to said first direction, said first and second planar band electrodes formed on respective mutually confronting surfaces of said first and second insulating substrates, mutually intersecting confronting portions of said first and second planar band electrodes forming the unit display regions; and a display layer, disposed between said first and second insulating substrates, capable of being switched between an active or inactive state based upon respective potentials applied across said first and second planar band electrodes, at least one of said first and second planar band electrodes of each of said unit display regions having insulating films formed thereon, each of said insulating films of constant, equal thickness and including a plurality of portions of mutually different impedance, said display layer being of uniform thickness throughout the display device;

each of said insulating films being formed of a plurality of first laminated insulating layers of thickness t and a second insulating layer formed entirely over said plurality of first laminated insulating layers as a leveling film, the number of first laminated insulating layers of each of said plurality of portions of said insulating films within each of the display regions being mutually different.

* * * * *